(No Model.)

C. H. GOEBEL.
CONDUIT FOR ELECTRIC WIRES.

No. 297,927. Patented Apr. 29, 1884.

WITNESSES:
H. P. Grant,
W. F. Kircher

INVENTOR:
Christian H. Goebel
BY John A. Diedersheim
ATTORNEY.

N. PETERS, Photo-Lithographer, Washington, D. C.

UNITED STATES PATENT OFFICE.

CHRISTIAN H. GOEBEL, OF PHILADELPHIA, PENNSYLVANIA, ASSIGNOR TO THE GOEBEL SECTIONAL ELECTRIC UNDERGROUND AND PNEUMATIC DELIVERY COMPANY, OF NEW JERSEY.

CONDUIT FOR ELECTRIC WIRES.

SPECIFICATION forming part of Letters Patent No. 297,927, dated April 29, 1884.

Application filed September 21, 1883. (No model.)

*To all whom it may concern:*

Be it known that I, CHRISTIAN H. GOEBEL, a citizen of the United States, residing in the city and county of Philadelphia, State of Pennsylvania, have invented a new and useful Improvement in Conduits for Electric Wires, which improvement is fully set forth in the following specification and accompanying drawings, in which—

Figure 1:
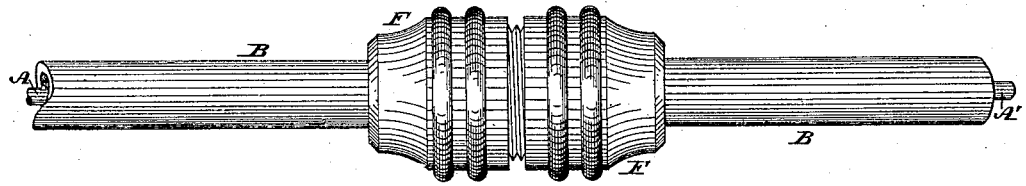
Figure 2:
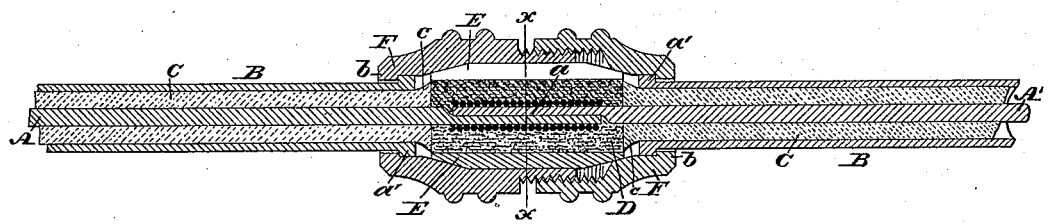
Figure 3:
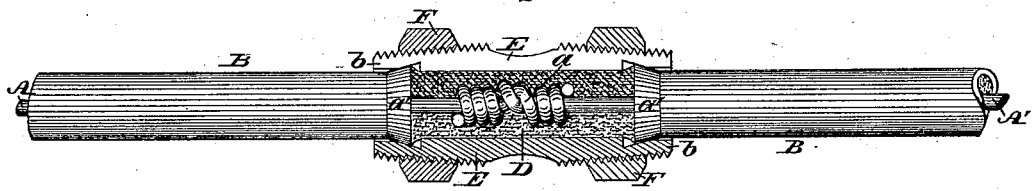
Figure 4:
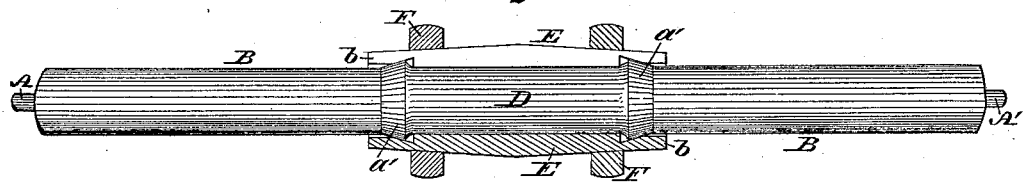
Figure 5:
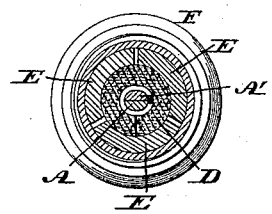

Figure 1 is a side elevation of a conduit for electric wires embodying my invention. Fig. 2 is a longitudinal section thereof. Figs. 3 and 4 are longitudinal sections of modifications thereof. Fig. 5 is a transverse section in line *x x*, Fig. 2.

Similar letters of reference indicate corresponding parts in the several figures.

My invention consists of a conduit for electric wires provided with a coupling whose joints are close and tight, so that water, &c., is prevented from entering the same, the wires are thoroughly insulated in the couplings, and the tubing of the conduit is securely connected.

Referring to the drawings, A A' represent pieces of wire for telegraph, telephone, or other electric purposes, the ends thereof being spliced or otherwise united, as at *a*.

B represents tubing or tubes of metal or other suitable material, within which the wires are fitted, the latter being suitably covered with rubber or other material, as at C.

D represents a split collar or packing of rubber or other insulating material of a compressible nature encircling the spliced ends of the wires; and E represents a sectional or divided collar formed of segmental plates, which are placed around the periphery of said collar D, the outer faces or backs of said plates being tapering at the ends thereof.

F represents a coupling-sleeve, which in Figs. 1 and 2 is formed of sections threaded so as to be screwed together, and having their inner faces tapering, in order to engage with the tapering backs of the segmental plates E. The ends of the tubes B adjacent to the splicings of the wires are headed or shouldered, as at *a'*, and the ends of the sleeves F are formed with flanges *b*, which are adapted to engage with the shoulders of the tubes. The ends of the coverings C of the wires adjacent to the splicings thereof are within the sleeve F and abut against the collar D, and said ends are flanged, headed, or swelled or enlarged by compression, as at *c*, so as to be of greater diameter than that of the tubes, for preventing slipping of the covering C and causing the same to abut tightly against the collar D when the tubes B are coupled. It will be seen that when the ends of the wires are spliced, said ends being outside of the coverings C, the collar D is fitted over the spliced ends of the wires and the segmental plates E applied around the collar D. The opposite sections of the sleeve F are fitted over the two lengths of pipe and screwed together, thus coupling said lengths and clamping the segmental plates E, whereby the collar or packing D is compressed on the connected ends of the wire, and the coverings C of wires and the collar D are forced together end to end, the joints of the coupling thus being close and tight, so that water, &c., is prevented from reaching the splicings, the wires are thoroughly insulated in the coupling, and the tubes are securely connected. In Fig. 3 the backs of the segmental plates are threaded and the sleeves F screwed thereon at opposite ends, thus acting as climbing nuts, forcing said plates against the collar D and compressing the same. In Fig. 4 the tapering backs of the plates are unthreaded, and the inner periphery of the sleeves F are also unthreaded, so that the sleeves may be driven toward each other on the collar, thus compressing the latter, the coupling produced in either figure being close, tight, and secure.

Having thus described my invention, what I claim as new, and desire to secure by Letters Patent, is—

1. In a conduit for electric wires, a split or divided collar of compressible material encircling the connected ends of the wires, segmental plates of rigid material with tapering backs surrounding said collar, and a clamping-sleeve with tapering inner faces fitted over said segmental plates, combined and operating substantially as and for the purpose set forth.

2. In a conduit for electric wires, a coupling consisting of a split or divided collar of compressible material encircling the connected ends of wires, segmental plates of rigid material surrounding said collar, a clamping-sleeve fitted over said segmental plates, and tubing inclosing the wires formed at the ends within the coupling with shoulders, substantially as and for the purpose set forth.

CHRISTIAN H. GOEBEL.

Witnesses:
JOHN A. WIEDERSHEIM,
A. P. GRANT.